United States Patent [19]
Taguchi et al.

[11] 3,913,114
[45] Oct. 14, 1975

[54] ELECTRICAL DRIVING DEVICE FOR CAMERA

[75] Inventors: Tatsuya Taguchi, Tokyo; Yoji Sugiura, Yokohama; Hiroshi Aizawa, Machida; Masanori Uchidoi, Kawasaki; Tomonori Iwashita, Chofy, all of Japan

[73] Assignee: Canon Kabushiki Kaisha, Tokyo, Japan

[22] Filed: Jan. 25, 1974

[21] Appl. No.: 436,450

[30] Foreign Application Priority Data
Feb. 1, 1973 Japan.................................. 48-13431

[52] U.S. Cl.................................. 354/204; 354/173
[51] Int. Cl.²......................................... G03B 17/42
[58] Field of Search ............ 354/173, 204; 242/71.5

[56] References Cited
FOREIGN PATENTS OR APPLICATIONS
37-2230    5/1962    Japan.................................. 354/173

*Primary Examiner*—John M. Horan
*Attorney, Agent, or Firm*—Toren, McGeady and Stanger

[57] ABSTRACT

The present invention relates to an electrical driving device for the camera in which the winding up operation for shutter charging and film winding up and the shutter release operation can be carried out repeatedly, characterized in that with the first solar rotary body for the above mentioned winding up operation the second rotary body presenting a different number of teeth or a different diameter from the first solar rotary body is provided coaxially, while a rotary body system comprising the first and the second solar rotary body which are connected with a satelite rotary body pivoted on the driving rotary member in such a manner that the rotary motion can be transmitted is provided, whereby the winding up operation is carried out by means of the first solar rotary body while the second solar rotary body being controlled in a certain determined position, while the shutter release operation is carried out by means of the second solar rotary body while the above mentioned control in a certain determined position being resolved after finishing the winding up operation.

6 Claims, 7 Drawing Figures

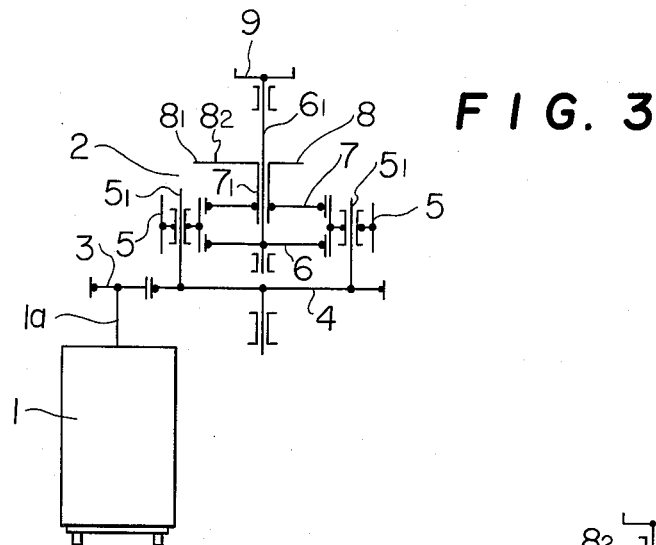
FIG. 3
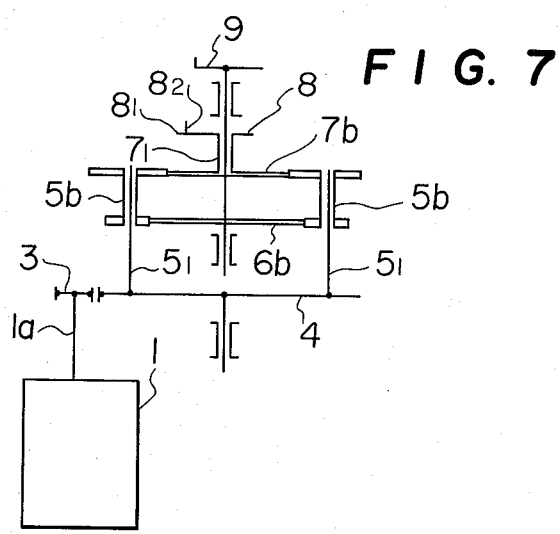
FIG. 6
FIG. 7

ELECTRICAL DRIVING DEVICE FOR CAMERA

BACKGROUND OF THE INVENTION

1. Field of the Invention:

The present invention relates to an electrical driving device for a camera, and particularly to an electrical driving device for the camera in which the winding up mechanism is driven electrically.

2. Description of the Prior Art:

In the winding up mechanism generally speaking there are two systems, namely the first one according to which the winding up shaft is always rotated along a determined direction so as to carry out the winding up operation and the second one according to which the winding up shaft which has been once wound up is returned into the ready position so as to complete the winding up operation. The first system has such a strong point that the motor driving mechanism can easily be mounted and further the operability is much improved because the winding up shaft is always rotated along a determined direction, but at the same time has such a weak point that the camera itself becomes expensive and further its construction becomes much complicated because a special clutch mechanism becomes necessary to rotate the winding up shaft always along a determined direction. On the other hand according to the second system the mechanism of the winding up shaft can be simplified and the camera itself can be produced at a lower cost. Therefore recently the electrical winding up mechanism according to the second system is in great demand. However, in case of the electrical winding up according to the second system it is necessary to provide a means to allow the winding up shaft which has been once wound up to return into the ready position. As the means to allow the above mentioned returning of the winding up shaft a reverse rotation system according to which the returning of the winding up shaft is carried out by the reverse rotation of the driving motor or a disengaging system according to which the winding up is carried out by means of a clutch and then the engagement of the driving motor with the winding up engaging means is resolved so as to allow the returning of the winding up shaft. However, the reverse rotation system has such a weak point that the control circuit of the motor becomes complicated while due to the time loss at the time of the reverse rotation of the motor a high speed photographing cannot be carried out. On the other hand the disengaging system has such a weak point that as disengaging means it is necessary to provide a clutch or the like so that not only the construction becomes complicated but also much space is needed for that in such a manner that the camera itself becomes large and expensive.

The first purpose of the present invention is to eliminate the above mentioned weak point, whereby by means of a rotary body system of simple construction comprising the first and the second solar rotary body and of a satelite rotary body the winding up operation and the shutter release operation are carried out repeatedly.

The second purpose of the present invention is to disengage the winding coupler from the driving motor by means of a rotary body after finishing the winding up in such a manner that the shutter mechanism is not released while the shutter mechanism is under an unfavorable force due to the remaining torque.

The third purpose of the present invention is to detect the torque working upon the winding up coupler and to stop the winding up operation when it is detected that the torque working upon the winding up coupler surpasses a certain determined limit value.

The fourth purpose of the present invention is to carry out the winding up operation and the shutter release operation alternatively and repeatedly by means of the latch relay.

BRIEF DESCRIPTION OF THE DRAWINGS

FIG. 3 shows a skelton of the gear system as the rotary body system of FIGS. 1 and 2.

FIG. 6 shows the first variation of the gear system shown in FIG. 3 in skelton.

FIG. 7 shows the second variation of the gear system shown in FIG. 3 in skelton.

DESCRIPTION OF THE PREFERRED EMBODIMENTS

Figure 1:
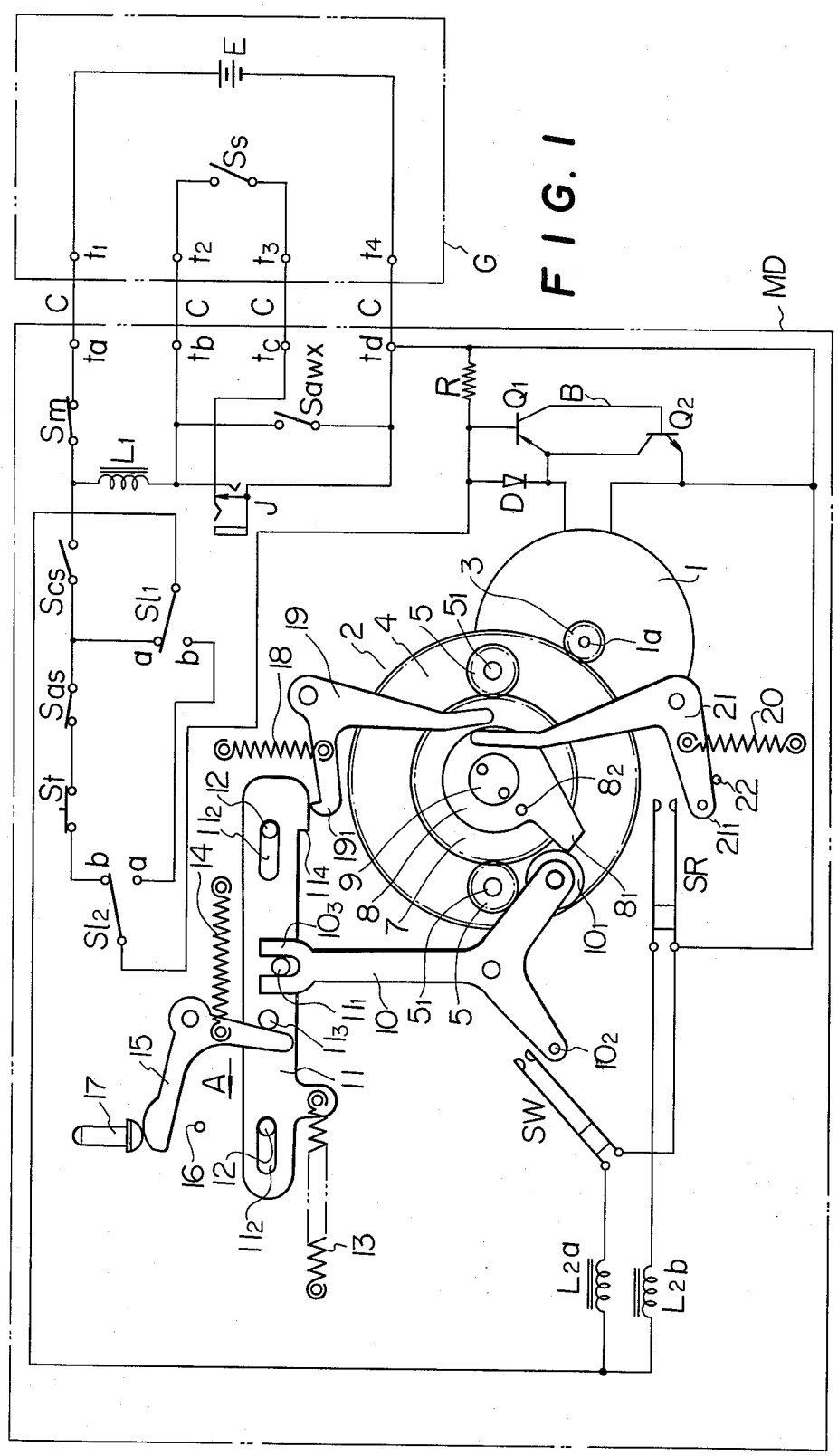
FIG. 1 shows an embodiment of the present invention during the winding up operation.
Figure 2:
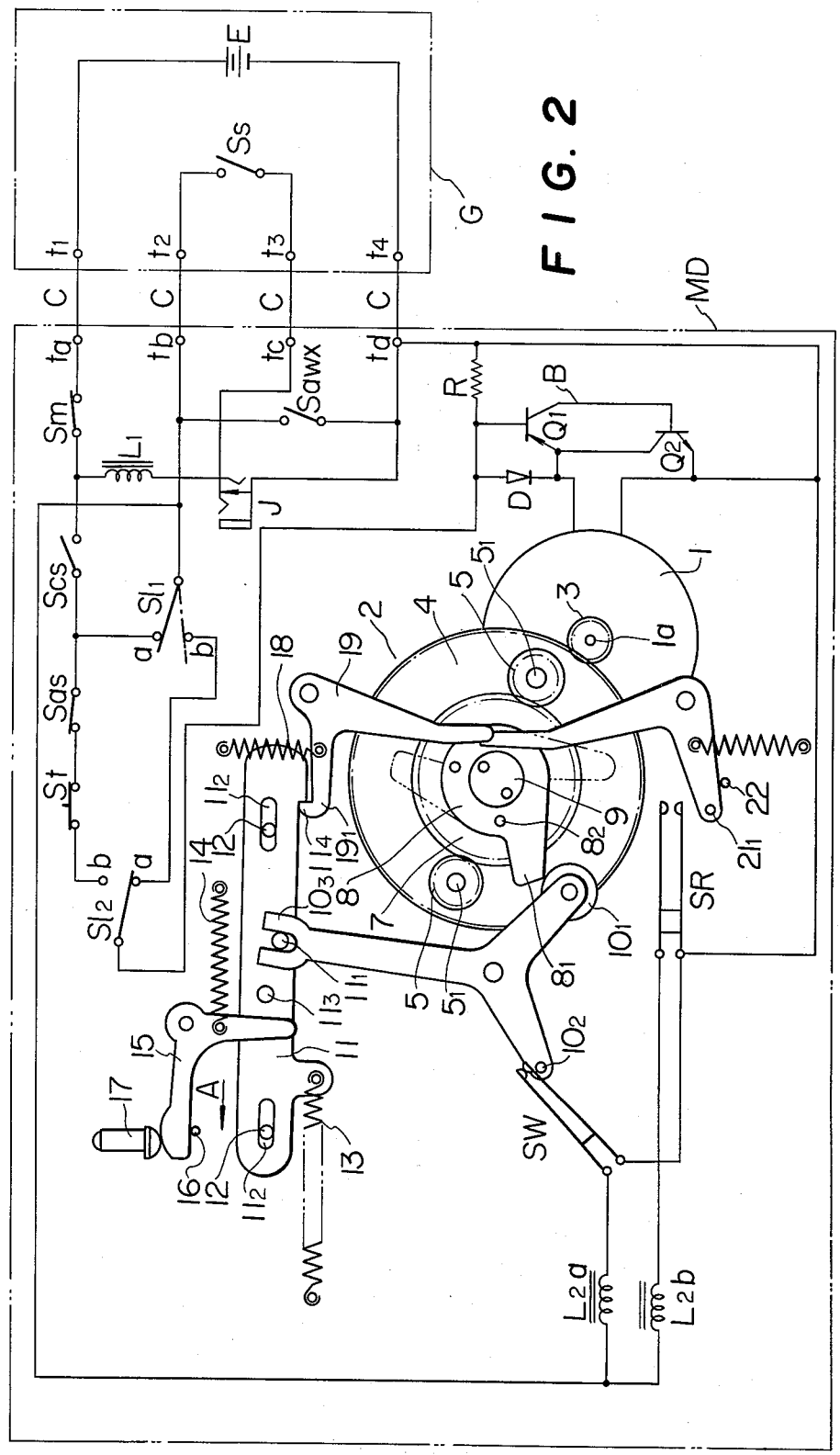
FIG. 2 shows the embodiment of FIG. 1 after finishing of the winding up operation.

The present invention will be explained according to the attached drawings of an embodiment of the present invention. FIG. 1 and FIG. 2 show the device, whereby MD is the motor drive body while G is the grip for containing the battery. The electrical connection circuit between the motor drive body MD and the grip G for containing the battery will be explained later, and at first the construction of the motor drive body MD will be explained. 1 is the motor as driving source, which is so constructed to drive the gear system 2 as rotary body system. The construction of the gear system is as is shown in FIG. 3. Namely the gear 4 as driving rotary member engages in the gear 3 mounted on the rotary shaft $1a$ of the above mentioned motor 1 so as to drive the gear system 2. On the gear 4 two diametrically mounted shafts $5_1$ for the satelite gears 5 as satelite rotary body are provided, whereby the satelite gears 5 are rotatable around the shafts $5_1$. Between these two satelite gears 5 and 5 the first solar gear 6 and the second solar gear 7 as the first and the second solar rotary body engaging with the satelite gears 5 are provided parallel to each other in such a manner that the satelite gears 5 are rotated around the first and the second solar gear 6 7 by means of the rotation of the gear 4. Coaxially with the second solar gear 7 a cam 8 is provided, which presents a projecting working edge $8_1$ and a pin $8_2$ mounted on its upper surface. Further the shaft $6_1$ of the first solar gear 6 is prolonged upwards, whereby the prolonged shaft $6_1$ going through the above mentioned rotatable shaft $7_1$ bears the winding up engaging member 9. The number of teeth of the second solar gear 7 is by one or several teeth larger than that of the first solar gear 6. (For the sake of the engaging pitch circle the first and the second solar gear 6 and 7 are displaced to each other so as to be in a position to engage with the satelite gear 5). The relation between the satelite gear 5 and the first and the second solar gear 6 and 7 is such that in case the rotation of the second solar gear 7 is prevented, the first solar gear 6 is rotated anticlockwise while in case the rotation of the first solar gear 6 is prevented, the second solar gear 7 is rotated clockwise and in case the first and the second solar gear 6 and 7 are freed, the first and the second solar gear 6 and 7 can be freely rotated keeping the difference of the speed corresponding to the difference between the numbers of the teeth of the first and the second solar gear 6 and 7 without rotating the gear 4. Therefore by preventing the second solar gear 7 from the rotation and rotating the satelite gear 5 anticlockwise once around the second solar gear 7, the first solar gear 6 is advanced anticlockwise relative to the absolute position by the difference of the numbers of the teeth so as to rotate the winding up engaging member 9. The ratio of the reduction obtained by the rotation of the first solar gear 6 by the difference of the numbers of the teeth during one rotation of the satelite gear 5 is given by the ratio of the difference of the numbers of the teeth of the first and the second solar gear 6 and 7 to the number of the teeth of the first solar gear 6. Hereby the winding up engaging member 9 is so designed as to drive the not shown winding up coupler for shutter charging and the film winding up in rotation by means of the rotation of the first solar gear 6. When the winding up at the camera side is completed by the driving of the above mentioned winding coupler, the winding up mechanism of the camera is locked by means of a stopper in such a manner that the further driving of the winding up coupler is prevented. 10 is the Y-shaped lever for binding the second solar gear 7, being pivoted at the parting part, whereby at the end of the one foot of the binding lever $10_1$ a roller binding the working edge $8_1$ of the above mentioned cam 8 is provided while at the end of the other foot of the binding lever 10 a pin $10_2$ for switching in the switch SW is provided. Hereby the end of the longer foot of the binding lever 10 is U-shaped $10_3$. This binding lever 10 usually prevents the second solar gear 7 from the rotation by means of the roller $10_1$, while the working edge $8_1$ of the cam 8 is so designed as to push away the roller $10_1$ against the force of the spring 13 of the sliding plate to be explained later in case the reaction is increased by the finishing of the winding up at the camera side, so that then the binding lever 10 is rotated clockwise. Hereby the pin $11_1$ provided on the sliding plate 11 engages in the opening of the fork shaped part $10_3$ of the binding lever 10. This sliding plate 11 is slidable by means of the guide groove $11_2$ and the pin 12 projecting out of the casing and is urged along the direction of the arrow A by means of the spring 13. With the projection $11_3$ provided on this sliding plate 11 the one foot of the L-shaped shutter release lever 15 urged anticlockwise by means of the spring 14 engages, whereby the shutter release lever 15 is so designed as to be rotated up to the position of the stopper 16 by means of the spring 14 when the sliding plate 11 is moved along the reverse direction of the arrow A. Hereby a shutter release pin in engagement with the not shown shutter release member of the camera is provided so as to functionally engage with the shutter release lever 15. Further with the stepped part $11_4$ provided at the one end of the sliding plate 11 the projection $19_1$ provided at the end of the one foot of the L-shaped engaging lever 19 urged clockwise by means of the spring 18 engages. The end of the other foot of this engaging lever 19 is located on the cam 8 so as to assume a position diametical to the roller $10_1$ of the binding lever 10. The projection $19_1$ of this binding lever 10 engages with the stepped part $11_4$ of the sliding plate 11, when the sliding plate 11 is moved along the reverse direction of the arrow A, and goes out of the engagement with the stepped part $11_4$ by pressing of the pin $8_2$ of the cam 8 upon the end of the other foot of the engaging lever 19. Further on the cam 8 close to the engaging lever 19 the one foot of the L-shaped lever 21 urged up to the position of the stopper 22 anticlockwise by means of the spring 20 is located. On the other foot of this lever 21 a pin $21_1$ for switching off the switch SR is provided. This lever 21 is pushed down by means of the pin $8_2$ of the cam 8 after the engaging lever 19 is pushed down, whereby the switch SR is closed.

Figure 4:
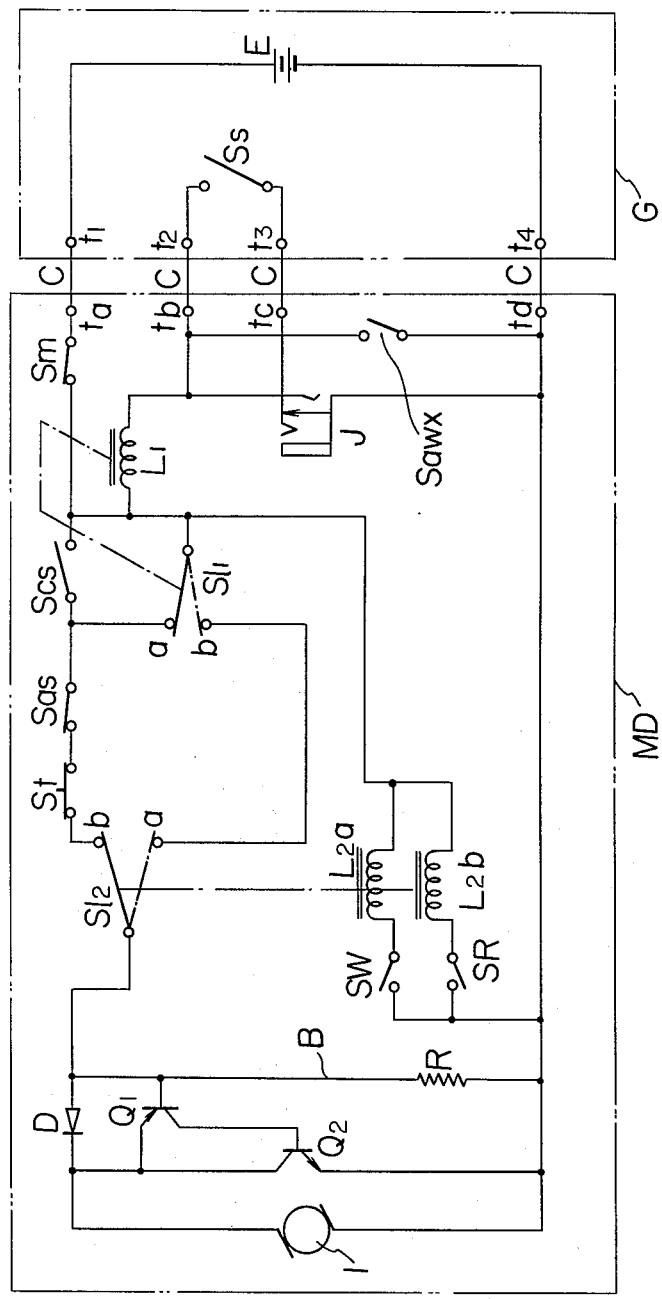
FIG. 4 shows an electrical circuit shown in FIGS. 1 and 2.

Below the electrical circuit of the motor drive body MD and of the grip G containing the battery will be explained. FIG. 4 shows the electrical circuit shown in FIGS. 1 and 2, whereby in the grip G containing the battery E is the D.C. current source, whose positive and negative terminal are respectively connected to the connector terminals $t_1$ and $t_4$. $S_s$ is the starting switch to be closed by operating the not shown operation button, whereby both terminals of $S_s$ are respectively connected to the connector terminals $t_2$ and $t_3$. The connector terminals $t_1$, $t_2$, $t_3$ and $t_4$ of the grip G for containing the battery are respectively connected to the connector terminals $t_a$, $t_b$, $t_c$ and $t_d$ of the motor drive body MD by means of the cords C. Hereby in the motor drive body MD the connector terminal $t_a$ is connected to the fixed contact $b$ of the relay contact $sl_2$ of the latch relays $L_{2a}$ and $L_{2b}$ through the main switch Sm, the switching over switch $S_{ce}$ by means of whose switching on and switching off the continuous photographing is switched over to the single photographing, the switch $S_{as}$ which is automatically switched off by means of a conventional means (not shown) when the film is over and the rear focal plane signal switch $S_t$ which is driven by the member for giving the signal of the finishing of the operation of the shutter of the camera and is switched off only during the operation of the shutter, in series. Further the fixed contact b of the relay contact $Sl_2$ is connected to the fixed contact b of the relay contact $Sl_1$ of the release relay $L_1$. The fixed contact a of the relay contact $Sl_1$ is connected to the connecting point of the above mentioned switching over switch $S_{cs}$ and the switch $S_{as}$, while the movable contact of the relay contact $Sl_1$ is connected to the connecting point of the main switch Sm and the switching over switch $S_{as}$. To the connecting point of the main switch Sm and the switching over switch $S_{cs}$, the connector terminal $t_b$ is connected through the release relay $L_1$. The release relay $L_1$ switches the movable contact of the relay contact $Sl_1$ over to the fixed contact b when excited and switches the movable contact of the relay contact $Sl_1$ over to the fixed contact a when not excited. Hereby an auxiliary release switch $S_{awx}$ such as release cable is connected between the connector terminal $t_b$ and the connector terminal $t_d$. Further the connector terminals $t_b$ and $t_c$ are connected to the first and the second contact of the terminal J for the timer of the wire remote control. The third contact of the terminal J is connected to the connector terminal $t_d$. Hereby to the connecting point of the above mentioned switching over switch $S_{cs}$ and the main switch Sm, the connector terminal $t_b$ is connected through a series network consisting of the latch relay $L_{2a}$ and the signal switch $S_w$ for the finish of winding up and a series network consisting of the latch relay $L_{2ab}$ and the signal switch SR for the release operation, whereby both series networks are connected parallel to each other. This latch relay $L_{2a}$ switches the movable contact of the relay contact $Sl_2$ over to the fixed contact a when excited and keeps this state even if no more excited until the latch relay $L_{2b}$ is excited. Further the latch relay $L_{2b}$ switches the movable contact of the relay contact $Sl_2$ over to the fixed contact b when excited and keeps this state even if no more excited until the latch relay $L_{2a}$ is excited. Further the cathode of the above mentioned diode D is connected to the emitter of the first transistor $Q_1$, whose base is connected to the anode of the diode. Further the base of the first transistor $Q_1$ is connected to the connector terminal $t_d$ through the resistance R, while the collector of the first transistor $Q_1$ is connected to the base of the second transistor $Q_2$ whose collector is connected to the cathode of the diode and whose emitter is connected to the connector terminal $t_d$. The first and the second transistor $Q_1$ and $Q_2$, the resistance R and the diode D compose a brake circuit B, which serves to prevent the binding cam 8 from its meaningless advance in phase due to the inertia of the rotor of the motor 1 and the gear system 2. Namely when the motor 1 is under the voltage of the current source a voltage decrease takes place between the anode and the cathode of the diode D which voltage decrease works as reverse bias between the base and the emitter of the first transistor so that the first and the second transistor $Q_1$ and $Q_2$ are switched off in such a manner that the brake circuit B does not work, while the motor 1 is no more under the voltage, the rotation has the tendency to be kept due to the inertia of the rotor of the motor 1 and the gear system 2, when the motor works as generator inducing a positive and a negative voltage at the positive and the negative terminal. This induced voltage works as forward bias between the emitter and the base of the first transistor $Q_1$ so that the first and the second transistor $Q_1$ and $Q_2$ are switched on in such a manner that the brake circuit is in operation. Therefore the terminal of the motor 1 assumes a short circuited state through the collector and the emitter of the second transistor $Q_2$ now in a conductive state so that the motor 1 is braked and stops instantly.

Below the art of the operation of the above mentioned disposition, whereby at first the single photographing is explained. At first all the switches and the contacts are supposed to be in the state as shown in FIG. 2. Suppose that the photographer switches off the switching over switch $S_{cs}$ to carry out the single photographing as shown in the drawing, switches on the main switch Sm and pushes down the start button so as to switch on the start switch $S_s$, so a closed circuit is formed through the positive terminal of the current source E → the connector terminal $t_2 t_a$ → the main switch Sm → the relay $L_1$ → the connector terminal $t_b \ t_2$ → the start switch $S_s$ → the connector terminal $t_3 t_c$ → the outer terminal J → the connector terminal $t_d \ t_4$ → the negative terminal of the current source E, whereby, the relay $L_1$ being excited, the movable contact of the relay contact $Sl_1$ is switched over to the fixed contact. Thus the first current supply circuit is formed through the positive terminal of the current source E → the connector terminal $t_1 \ t_a$ → the main switch Sm → the fixed terminal b of the relay contact $Sl_1$ → the fixed contact a of the relay contact $Sl_2$ → the diode D → the motor (1) → the connector terminal $t_d \ t_4$ → the negative terminal of the current source E so that the motor 1 is driven. At this time the first solar gear 6 is not in a position to be rotated by means of the mechanism for preventing the no film feeding of the winding up shaft. Thus the second solar gear 7 and the cam 8 are rotated clockwise. Hereby the pin $8_2$ on the cam 8 pushes the end of the other foot of the engaging lever 19 so as to rotate the engaging lever 19 anticlockwise. Thus the engagement of the projection $19_1$ of the engaging lever 19 with the stepped part $11_4$ of the sliding plate 11 is resolved so that the sliding plate 11 is moved along the direction of the arrow A by means of the spring 13, when the projection $11_3$ of the sliding plate pushes up the camera release pin 17 by means of the release lever 15, driving the not shown shutter starting member so as to start shutter. At the same time by means of a not shown conventional mechanism of the camera the switch $S_t$ is switched off while the binding lever 10 is rotated anticlockwise, so that the pin $10_2$ of the binding lever 10 withdraws from the position for pushing down the switch $S_w$ as to switch off the switch $S_w$. Hereby the latch relay $L_{2a}$ is no more excited. However due to the nature of the latch relay the movable contact of the relay contact $Sl_2$ keeps the fixed contact a in a closed state, keeping the supply of current to the motor 1. Thus the motor 1 keeps rotation so that, after the above mentioned binding lever 19, the pin $8_2$ of the cam 8 pushes the end of the one foot of the lever 21 so as to rotate the lever 21 clockwise. By means of the rotation of this lever 21 the pin $21_1$ of the lever 21 switches on the switch SR. Thus a closed circuit is formed through the positive terminal of the current source E → the connector terminal $t_1 t_a$ → the switch Sm → the latch relay $L_{2b}$ → the switch SR → the connector terminal $t_d t_4$ → the negative terminal of the current source E so that the latch relay $L_{2b}$ is excited. Thus the movable contact of the relay contact $Sl_2$ is switched over to the fixed contact b. Thus the above mentioned first current supply circuit does not exist any more so that the brake circuit B works so as to stop the motor 1 instantly. The position at which the cam 8 stops at this time is shown by the double dotted line in FIG. 2. On the other hand parallel to the above the shutter at the camera side continues to operate and when the shutter is closed the not shown signal member for the finish of the shutter operation at the camera side in such a manner that the rear forcal plane signal is switched on again so as to close the switch $S_t$. Now the operation for the exposure at the camera side and the motor drive side is completed and the next winding up is ready for operation. When the photographer then releases the operation button for the motor drive the start switch $S_s$ is opened and the relay $L_1$ is no more excited. Thus the movable contact of the relay contact $Sl_1$ is switched over to the fixed contact a.

Thus the second current supply circuit is formed through the positive terminal of the current source E → the connector terminal $t_1 t_a$ → the main switch Sm → the fixed contact a of the contact $Sl_1$ → the automatic stop switch $S_{as}$ → the switch $S_t$ → the fixed contact b of the contact $Sl_2$ → the diode D → the motor (1) → the connector terminal $t_d t_4$ → the negative terminal of the current source E, so that the motor 1 is rotated clockwise in FIG. 1. The rotation of this motor 1 is reduced down by means of the gears 3 and 4, rotating the satelite gear 5 fixed on the gear 4 anticlockwise. Due to the rotation of this satelite gear 5 the first solar gear 6 is rotated. The reason why the first solar gear 6 is rotated is that the cam 8 mounted coaxially with the second solar gear 7 is instantaneously bound by means of the roller $10_1$. During one anticlockwise rotation of the satelite gear 5 around the solar gear the first solar gear 6 is rotated in such a manner that the first solar gear 6 advances in phase relative to the absolute position by the number of the teeth of the first solar gear 6 and of the second solar gear 7. Thus the winding up engaging member 9 making one body with the first solar gear 6 is rotated so that the winding up coupler for shutter charging and for film feeding is driven so as to complete the winding up operation. When the winding up operation at the camera side is finished, the winding up mechanism of the camera is stopped by means of the stopper, whereby the rotation of the first solar gear 6 is prevented. Hereby both of the rotation of the first solar gear 6 and that of the second solar gear 7 are about to be prevented. However the binding force preventing the rotation of the second solar gear 7 is an incomplete binding force given by the force of the spring 13 of the sliding plate 11, so that the binding roller $10_1$ is put aside by means of the working edge $8_1$ of the cam 8 due to the reaction at the time when the rotation of the first solar gear 6 is prevented in such a manner that the second solar gear 7 is rotated clockwise. When the working edge $8_1$ of the cam 8 puts the binding roller $10_1$ aside, the binding lever 10 is rotated clockwise in such a manner that the sliding plate 11 is moved along the reverse direction of the arrow A in the drawing. Together with the movement of the sliding plate 11 the projection $11_3$ is moved so that the release lever 15 is rotated anticlockwise up to the position of the stopper 16 by means of the spring 14, moving the release pin 17 downwards to make the release ready for operation, while the sliding plate 11 with whose stepped part $11_4$, the projection $19_1$ of the engaging lever 19 engages is locked. At the same time the pin $10_2$ of the binding lever 10 closes the switch $S_w$. Thus a closed circuit is formed through the positive terminal of the current source E → the connector terminal $t_1 t_a$ → the main switch Sm → the latch relay $L_{2a}$ → the switch $S_w$ → the connector terminal $t_d t_4$ → the negative terminal of the current source E. Thus the latch relay $L_{2a}$ is excited, switching the movable contact of the relay contact $Sl_2$ over to the fixed contact a as shown in FIG. 2. Hereby the second current supply circuit to the motor 1 does not exist any more whereby the brake circuit B operates to stop the motor 1 instantaneously. At the time when the binding of the second solar gear 7 is resolved, the cam 8 advances clockwise into the position shown in a dotted line in FIG. 2 due to the returning force for recovering the ready position after the winding up of the winding up shaft of the camera. At the same time the winding up shaft returns to the winding up ready position while due to the mechanism for preventing no film feeding the next winding up is prevented until the shutter is released. Thus the device completely stops and the shutter is ready for operation.

Thus the initial state is resumed, and through repetition of the above mentioned operation the shutter is released when the operation button is pushed, while the winding up operation is carried out when the operation button is freed. After a certain determined number of photographing the switch $S_{as}$ in functional engagement of the not shown conventional counter mechanism is opened in such a manner that the device stops in the state immediately before the start of winding up.

Below the case with the continuous photographing will be explained. When in this case the switching over switch $S_{cs}$ is closed for the continuous photographing in the state shown in FIG. 1, the switch SR is closed after having finished the release operation in case of the aforementioned single photographing in such a manner that the above mentioned second current supply circuit is formed through the switching over switch $S_{cs}$ even if the movable contact of the relay contact $Sl_1$ remains switched over to the fixed contact b, so that the winding up is started when the switch $S_t$ is closed by means of the rear focal plane signal and the winding up operation and the shutter release operation are alternatively repeated so long as the operation button is pushed, while the device stops with the winding up finished when the operation button is freed, namely the so called continuous photographing can thus be carried out.

In the above mentioned embodiment the case G for containing the battery and the motor drive body MD are separated from each other, whereby the connector terminals $t_1$, $t_2$, $t_3$ and $t_4$ of the case G for containing the battery are respectively connected to the connector terminals $t_a$, $t_b$, $t_c$ and $t_d$ by means of the cord C. The purpose for this is to make it possible to keep the current source warm when the device is used under a very low temperature, whereby an independent current source can also be used. Thus it goes without saying that according to the present invention the case G for containing the battery and the motor drive body MD can be constructed as one body in case the device is not used under a very low temperature or an independent current source is not used.

Figure 5:
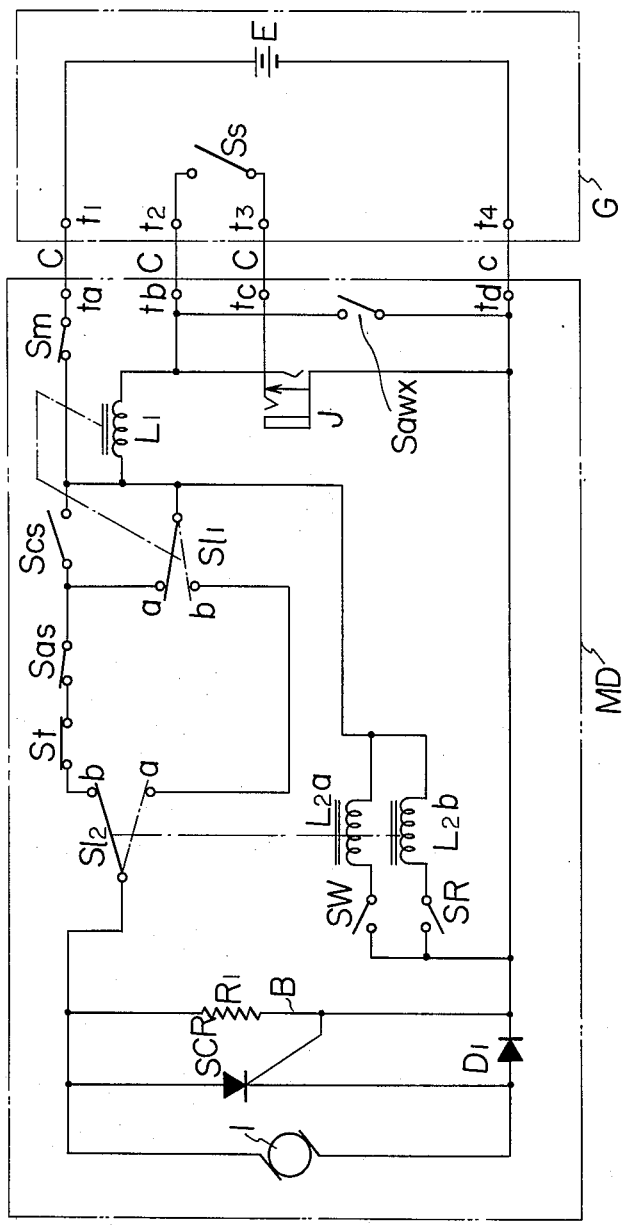
FIG. 5 shows a variation of the electrical circuit of FIG. 4, whereby the braking circuit is composed otherwise.

Further in the above mentioned embodiment the brake circuit B consists of the first and the second transistor $Q_1$ and $Q_2$, the resistance R and the diode D, whereby according to the present invention the brake circuit B is not necessarily limit to the above construction and the brake circuit B can also consist of the thyrister SCR, the diode D and the resistance $R_1$ as shown in FIG. 5. Namely in the brake circuit B the movable contact of the relay contact $Sl_2$ is connected to the connector terminal $t_d$ through a series network consisting of the motor 1 and the diode $D_1$ with the shown polarity, while the movable contact of the relay contact is connected to the anode of the diode $D_1$ through the thyrister SCR, the cathode of which diode $D_1$ is connected to the gate of the thyrister SCR and at the same time to the movable contact of the relay contact $Sl_2$ through the resistance $R_1$. The brake circuit B of the above mentioned construction does not operate when the current supply circuit to the motor 1 is formed, because the diode $D_1$ is biased along the forward direction in such a manner that no gate voltage is given to the thyrister SCR, while when the current supply circuit to the motor 1 does not exist any more the motor 1 serves as generator due to the inertia of the rotor of the motor 1 and the gear system 2 in such a manner that the diode D is biased along the reverse direction, giving a gate voltage to the thyrister so as to bring the brake circuit B in operation. As the result of this the current supply terminals of the motor 1 assumes a short circuited state, whereby the motor 1 is braked and stops instantaneously.

Further in the above mentioned embodiment the gear system 2 consists of the first and the second solar gear 6 and 7 which are coaxial but whose numbers of the teeth are different from each other and of the satelite gear 5 of the single teeth in engagement with the first and the second solar gear 6 and 7, whereby however the gear system according to the present invention is not necessarily limited to the above mentioned gear system. As shown in FIG. 6 as the first variation of the present invention the gear system 2b can consist of the first and the second solar gear 6a and 7a which are coaxial with each other but whose number of the teeth are different from each other and of the satelite gears 5a with double teeth which are coaxial with each other and engage with the first and the second solar gear 6a and 7a but whose numbers of the teeth are different from each other in order to practice the present invention. Further as shown in FIG. 7 as the second variation of the present invention the roller system can also consist of the first and the second solar rollers 6b and 7b which are coaxial with each other but present different diameters from each other and of the satelite rollers 5b which are coaxial with each other and in frictional engagement with the first and the second solar roller 6b and 7b but present different diameters from each other to practice the present invention.

As mentioned above according to the present invention it is possible to repeat the winding up operation and the shutter release operation by means of a simple mechanism consisting of the first and the second solar rotary body and the satelite body so that a device whose operation is stable can be produced compact economically with much ease. Further because after finishing the winding up operation the winding up coupler is separated from the driving motor by means of the rotary body system the shutter cannot be released while an unfavorable force due to the remaining torque is being given to the shutter mechanism so that a durable device whose shutter is operated smoothly with much accuracy and which is suited for the high speed photographing can be obtained. Further the system is such a one that the torque working upon the winding up coupler is detected and the winding up operation is stopped when a torque exceeding a certain determined limit is detected, so that the angular position, the rotation angle of the winding up mechanism can freely be set up. Hereby it is very profitable because it is not necessary to provide a means for calibration of the translation of the winding up stop position due to the wear of the parts arising from the repeated derive while the interchangeability can be guaranteed when the electric driving device is realized as accessary for camera. Further the winding up control circuit and the shutter release control circuit are alternatively operated by means of a latch relay, so that the control means for the self-holding and the opening of the contact can be constructed very simple in such a manner that there are few causes for the trouble and a device with high fidelity can be obtained. Namely when the current source is switched off due to the troubles the latch relay does not change the contacting state when the current source is switched on, so that, when the current source is again switched on after the troubles are removed, the operation is started in the state when the current source was switched on in such a manner that there are little danger for the trouble of the device, whose fidelity is very high. Further the switching over of the contact is carried out by a signal of a single pulse and not by a continuous signal so that the current consumption is very small, whereby when a battery is used as current source the durability of the battery is prolonged. Thus a profitable electric driving device can be obtained, because the operation is carried out electrically and therefore there are no restriction for the mounting position.

What is claimed is:

1. An electrical driving device for the camera in which the winding up operation for shutter charging and film winding up and the shutter release operation are carried out repeatedly comprising;
   - a driving means,
   - a driving rotary body connected with said driving means in such a manner that the rotation can be transmitted to the driving rotary body,
   - at least one satellite rotary body pivoted on said rotary body,
   - a solar rotary body for winding up operation connected with said satellite rotary body in such a manner that the rotation can be transmitted to said solar rotary body,
   - a solar rotary body for shutter release connected with said satellite rotary body in such a manner that the rotation can be transmitted to said solar rotary body, said solar rotary body for shutter release being coaxial with said solar rotary body for the winding up operation but presenting a different number of the teeth from that of said solar rotary body for the winding up operation,
   - binding means for controlling said solar rotary body for winding up in a certained determined position, said binding means being freed from controlling the determined position by the finishing of the winding up of said solar rotary body for the winding up operation,
   - a release means connected with said binding means in such a manner that said release means can operate in response to said binding means,
   - said release means presenting a lock means for locking said binding means, said lock means locking said binding means when the control of the determined position is freed, whereby the lock is released by the movement of said solar rotary body for shutter release.

2. An electrical driving device for the camera in which the winding up operation for shutter charging and film winding up and the shutter release operation are carried out repeatedly comprising;
   - a driving means,
   - a driving rotary body connected with said driving means in such a manner that the rotation can be transmitted to the driving rotary body,
   - at least one satellite rotary body pivoted on said rotary body,
   - a solar rotary body for winding up operation connected with said satellite rotary body in such a manner that the rotation can be transmitted to said solar rotary body,
   - a solar rotary body for shutter release connected with said satellite rotary body in such a manner that the rotation can be transmitted to said solar rotary body, said solar rotary body for shutter release being coaxial with said solar rotary body for the winding up operation but presenting a different number of the teeth from that of said solar rotary body for the winding up operation.

3. An electrical driving device for the camera in which the winding up operation for shutter charging and film winding up and the shutter release operation are carried out repeatedly comprising;
- a driving means,
- a driving rotary body connected with said driving means in such a manner that the rotation can be transmitted to the driving rotary body,
- at least one satelite rotary body connected with said driving rotary body pivoted on said driving rotary body,
- a solar rotary body for the winding up operation connected with said satelite rotary body in such a manner that the rotation can be transmitted to said solar rotary body for the winding up operation,
- a solar rotary body for the shutter release operation connected with said satelite rotary body in such a manner that the rotation can be transmitted to said solar rotary body for the shutter release operation, said solar rotary body for the shutter release operation being an independent body of the solar rotary body for the winding up operation but coaxial therewith and presenting a different number of the teeth than that thereof,
- a binding means for controlling said solar rotary body for the shutter release operation into a certain determined position, said binding means being freed from the determined position control when said solar rotary body for the winding up operation finishes its operation,
- a current source,
- a latch relay connected with said current source,
- a current supply control means for the shutter release to be connected between said current source and said driving means,
- a switching over means for switching said driving means over either to said current supply control means for the shutter release operation or to the current supply control means for the winding up operation, said switching over means being actuated by means of said latch relay.

4. An electrical driving device according to claim 3 in which said latch relay consists of the first and the second relay, whereby the first and the second relay are excited alternatively.

5. An electrical driving device according to claim 4 in which the first relay presents the first switch means for controlling the conductivity of said relay, whereby the first switch means is closed when said binding means is freed from the determined position control.

6. An electrical driving device according to claim 4 in which the second relay presents the second switch means for controlling the conductivity of said relay, whereby the second switch means is closed for a moment by means of the solar rotary body for the shutter release operation when said lock disengaging means has operated.

* * * * *